INVENTORS
ALFRED A. BURDA
WILLIAM F. BOTTOMS &
DONN E. BRANDOW
BY Gardner + Zimmerman
ATTORNEYS

# United States Patent Office 3,410,439
Patented Nov. 12, 1968

3,410,439
CROWNED ROOF FOR CARGO CONTAINERS
Alfred A. Burda and William F. Bottoms, El Sobrante, and Donn E. Brandow, Sacramento, Calif., assignors to Compass Container Company, Inc., Richmond, Calif., a corporation of California
Filed Aug. 1, 1966, Ser. No. 569,343
4 Claims. (Cl. 220—1.5)

ABSTRACT OF THE DISCLOSURE

A cargo container of the type used for bulk shipment and handling of various commodities is described which has a roof having a configuration preventing accumulation of water and yet which permits a similar cargo container to be stacked thereon. The roof is formed of a multi-layer wood laminate and has a flat marginal flange securing same to the side walls of the container. The central portion of the roof is gradually curved upwardly from the flange to a peak. The wood laminate is a flexible material which permits deflection of the roof to a flat configuration under the load of a similar cargo container stacked thereon and resilient return of the roof to the crown configuration on removal of the load.

---

This invention relates generally to cargo containers, and is more particularly directed to a crowned roof structure therefor and a method of making same.

Cargo containers for the bulk shipment and handling of various commodities are typically provided in the form of large volume rectangular enclosures. The walls and roof of such a container are usually of plywood and the roof is flat, if not slightly sagged. Consequently, water tends to accumulate on, and soak into the surface of the roof. Prolonged exposure to water is seriously detrimental to plywood, and as a result the life of a conventional cargo container roof is severely limited. Furthermore, cargo containers are frequently stacked on one another and the resulting load on the underneath container roofs, as well as the effects of water thereon, causes the roofs to develop permanent sags. This is especially undesirable since it reduces the interior height of each container and consequently limits the type and amount of goods which can be handled by the container. Since the exterior dimensions of a container must be within certain standard requirements, this problem cannot generally be solved by increasing the height of the container.

It is an object of the present invention to provide a crowned cargo container roof of plywood or the like which thereby prevents water from accumulating on the roof surface and detrimentally affecting the plywood.

Another object of the invention is to provide such a crowned cargo container roof which does not depend on height reducing interior bows or the like to form the crown.

A further object of the invention is the provision of a crowned roof which may be deflected flat under the load of a cargo container stacked thereon, but which resiliently returns to its crowned configuration upon removal of the load.

Still another object of the invention is to provide a method of making a flexible crowned roof of the class described.

It is a further object of the invention to provide a crowned roof of relatively low cost design.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
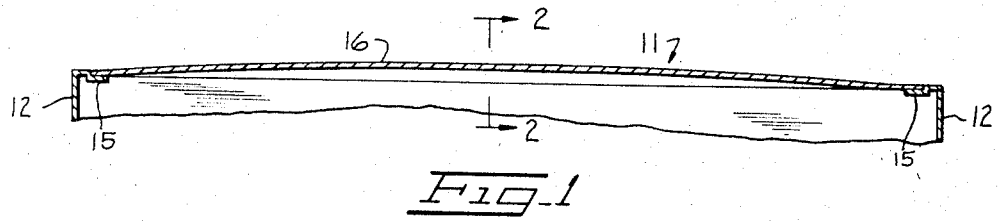
FIGURE 1 is a fragmentary sectional view through a crowned roof of a cargo container in accordance with the present invention.
Figure 2:
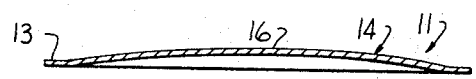
FIGURE 2 is a sectional view taken at line 2—2 of FIGURE 1.
Figure 3:
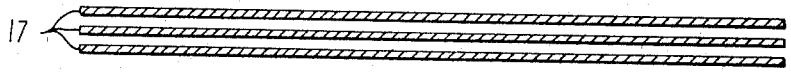
FIGURE 3 is a sectional view illustrating the initial stage of a method of making the crowned roof.
Figure 4:
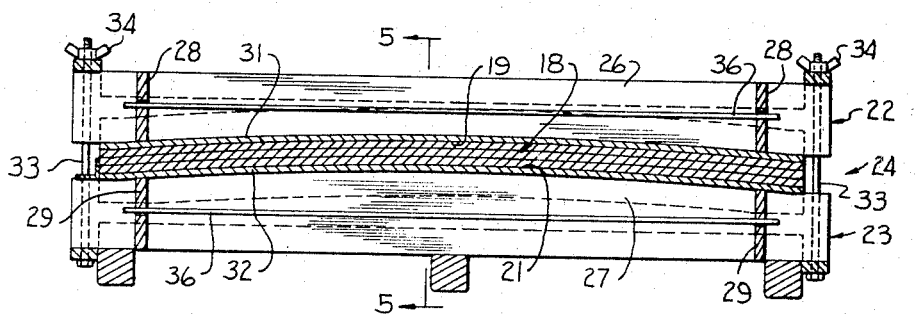
FIGURE 4 is a sectional view of a press as employed in the method.
Figure 5:
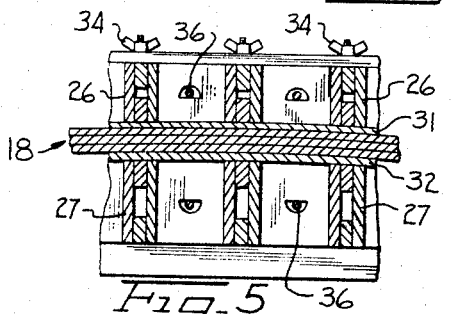
FIGURE 5 is a sectional view taken at line 5—5 of FIGURE 4.

Referring now to the drawing, there is shown a roof 11 marginally secured to the upper edges of the side walls 12 of a cargo container. In accordance with the particularly salient aspects of the invention, the roof is slightly crowned with respect to the upper edges of the side walls to facilitate the run off of water. Consequently, water is prevented from accumulating on the roof surface and soaking thereof is greatly minimized. The roof is preferably of plywood in the interest of economy of construction and yet has a materially increased life because of the previously noted minimized soaking by water afforded by the crowned configuration. Moreover, because of the particular construction of the roofs and the method for making the same, no internal cross bars or straps need be provided under the roof to form the crown. Thus, all of the internal space within the container can be used for cargo.

The crowned configuration of the roof 11 would normally preclude the stacking of one cargo container on top of another. However, according to a very important feature of the invention, the roof is constructed to be flexible such that it may be deflected to a flat position under the load of a cargo container stacked thereon. The roof is sufficiently resilient that upon removal of the load it assumes its normal crowned configuration. To the foregoing ends, the roof is provided with a flat rectangular marginal flange 13 from which the central portion 14 of the roof is crowned. The flange facilitates ready securance to brackets 15 projecting horizontally inwaid from the side walls 12. The central portion curves gradually upward from the flange to a central peak 16. The displacement of the peak from the flange is very slight compared to the marginal dimensions of the roof. For example, for a typical 8 foot by 19 foot roof, the peak displacement is advantageously ¼ inch. In addition, the roof is preferably of multi-layer laminated construction. In the foregoing specific example, the roof material is a laminate of three layers of ¼ inch plywood. It will be thus appreciated that although the roof is only slightly crowned, it is sufficient to prevent the accumulation of water. Only a slight amount of deflection is required to flatten the central portion 14, and the internal stresses within the material are sufficient to return the central portion to its normal crowned position.

Considering now a preferred method of making the crowned roof 11, a plurality of layers 17 of plywood, or the like, are first fabricated into a rectangular laminate 18. In this regard, the layers are secured together by coating adjacent surfaces with a suitable adhesive, such as the glue known as "Parad 2630" manufactured by Pacific Resin and Chemical Co., 3434—13th Ave. SW., Seattle, Wash., and placing the layers in stacked relationship. The laminate is placed between mating surfaces 19, 21 of complementary sections 22, 23 of a press 24. The surfaces 19, 21 are shaped to form the laminate to the crowned configuration described hereinbefore with the flat marginal flange. In this regard, the sections 22, 23 preferably include pluralities of parallel spaced ribs or templates 26, 27 respectively secured together as by means of slats 28, 29. The templates have appropriate contours such that a pair of sheets 31, 32 of plywood or the like secured thereto assumed the desired crowned configurations with the marginal flange, and define the mating surfaces 19, 21. Opposed pairs of the templates 26, 27 are traversed at their opposite ends by bolts 33 which receive wing nuts 34 to facilitate clamping of the press sections 22, 23 tightly together. Thus, when the laminate 18 is clamped between the sections 22, 23 the surfaces 19, 21 form the laminate into the crowned configuration. While the laminate is pressed, the adhesive is allowed to cure such that upon the subsequent removal of the laminate from the press, a crowned configuration is retained. Desirably, heat in an amount dependent upon the amount of glue employed is applied to the pressed laminate to accelerate the curing process. With the glue "Parad 2630" noted hereinbefore, a temperature of 90° F. is maintained on the pressed laminate for about four hours, after which the crowned structure may be removed from the press. To facilitate heating of the laminate, the spaces between adjacent templates 26, 27 are preferably traversed by heating rods 36 secured between the slats 28, 29. These spaces may be enclosed by bridging sheets of plywood, or the like (not shown) to define cells. The air in the cells is heated by the rods 36, and the hot air in turn heats the laminate through the intermediary of the sheets 31, 32.

What is claimed is:

1. A rectangular cargo container of the type used for bulk shipment and handling of various commodities, said cargo container including marginal side walls, a roof secured in closing relation to the upper edges of said side walls, said roof having a crowned configuration and being of flexible material which permits deflection of the roof to a flat configuration under the load of a similar cargo container stacked thereon and resilient return on removal of said similar container to said crowned configuration to prevent accumulation of water on said roof.

2. The combination of claim 1, wherein said roof has a flat marginal flange with a crowned central portion gradually curved upwardly therefrom to a peak, said peak displaced upward from said flange by a distance which is slight relative to the marginal dimensions of said roof.

3. The combination of claim 1, wherein said roof is formed of a multi-layer wood laminate.

4. The combination of claim 2, further defined by said roof being formed of a laminate comprising three layers of ¼ inch thick plywood secured in stacked relation by an adhesive, said roof having marginal dimensions of eight feet by nineteen feet, said peak displaced upward from said flange by a distance of ¼ inch.

References Cited
UNITED STATES PATENTS

| | | | |
|---|---|---|---|
| 219,373 | 9/1879 | White | 217—2 |
| 718,616 | 1/1903 | Gale | 217—17 |

THERON E. CONDON, *Primary Examiner.*

GEORGE E. LOWRANCE, *Assistant Examiner.*